United States Patent [19]

Colomer

[11] E Patent Number: Re. 31,792

[45] Reissued Date of Patent: Jan. 8, 1985

[54] FILTER WITH AUTOMATIC CLEANING

[75] Inventor: Pierre Colomer, Chatenay-Malabry, France

[73] Assignee: Interfiltre S.A., Livarot, France

[21] Appl. No.: 383,096

[22] Filed: May 28, 1982

Related U.S. Patent Documents

Reissue of:

[64] Patent No.: 4,285,353
Issued: Aug. 25, 1981
Appl. No.: 75,791
Filed: Sep. 14, 1979

[30] Foreign Application Priority Data

Jun. 18, 1979 [FR] France ..... 7915581

[51] Int. Cl.[3] ..... B01D 41/00; D01D 25/12

[52] U.S. Cl. ..... 134/181; 210/143; 210/409; 134/200

[58] Field of Search ..... 210/143, 407, 409, 236, 210/225; 134/172, 180, 181, 198, 200

[56] References Cited

U.S. PATENT DOCUMENTS

| | | | |
|---|---|---|---|
| 3,775,950 | 12/1973 | Hallamore | 134/172 |
| 3,780,747 | 12/1973 | Stadie et al. | 134/172 |
| 3,826,374 | 7/1974 | Busse et al. | 210/236 |
| 4,076,033 | 2/1978 | Busse et al. | 210/225 |

FOREIGN PATENT DOCUMENTS

| | | | |
|---|---|---|---|
| 2823333 | 12/1979 | Fed. Rep. of Germany | 134/172 |

*Primary Examiner*—William A. Cuchlinski, Jr.
*Assistant Examiner*—E. Rollins Cross
*Attorney, Agent, or Firm*—Norbert P. Holler; Charles A. Blank

[57] ABSTRACT

The invention relates to a filter with automatic cleaning using a hydraulically actuated sprinkling device. According to the invention, a carriage carrying tubes is driven by a hydraulic double-acting actuator. The working chambers of the hydraulic actuator are connected by off-take pipes to the cleaning liquid distributing circuit. Switching members control through the medium of electrically controlled valves the selective entry of the cleaning liquid into the off-take pipes. The device according to the invention can be used in an installation where air filtering is necessary, such as for example an air conditioning installation.

18 Claims, 3 Drawing Figures

FILTER WITH AUTOMATIC CLEANING

Matter enclosed in heavy brackets [ ] appears in the original patent but forms no part of this reissue specification; matter printed in italics indicates the additions made by reissue.

The present invention relates to an improvement in self-cleaning filters and particularly in filters cleaned periodically by a movable sprinkling device.

There are already known filters with automatic cleaning of the type provided with a sprinkling device comprising a sprinkling tube connected to a cleaning liquid distributing circuit and a carriage jointly movable with the sprinkling tube and adapted to perform a to-and-fro movement along the filter or filters to be cleaned while being supported by a transverse support. A rotary hydraulic motor is mounted on the carriage to ensure the movement of the latter. The motor is fed by the cleaning liquid distributing circuit and, more precisely, it is mounted in series with the tube in the said circuit.

The said device, which has proved itself to be particularly advantageous, may however be subject to some restriction in its use in the case of particularly important filter installations, for such installations require high power and therefore more bulky motors.

The purpose of the present invention is to provide a novel design of the above-described device, characterized by considerable power combined with a particularly compact form.

More precisely, the invention relates to a filter with automatic cleaning of the type provided with a frame on which are mounted filtering panels, a sprinkling device comprising at least one sprinkling tube connected to a circuit for distributing a cleaning circuit, such as in particular water, and a carriage jointly movable with the tube and adapted to perform a to-and-fro movement along the filtering panel or panels to be cleaned while being supported on a transverse rail support, the said carriage being displaced by traction means with a hydraulic motor, characterized in that the said hydraulic motor traction means for the said carriage are constituted by a hydraulic double-acting actuator secured to the frame, driving the said carriage through the medium of a transmission member and in that the working chambers of the hydraulic actuator are selectively connected to the cleaning liquid in the distributing circuit through the medium of a switching system.

According to another characterizing feature of the invention, the transmission member connecting the hydraulic actuator to the carriage is constituted by at least one tackle system associated with the movable portion of the actuator.

The device according to the invention offers several advantages. In the first place, the actuator which is used as a hydraulic motor provides high power. On the other hand, owing to the simplicity of its structure, the actuator is characterized by its sturdiness and therefore confers high reliability to the whole device. On the other hand, the use of a hydraulic motor secured to the frame of the filter allows all mechanical problems, counterbalancing problems and inertia problems, which arise in case of use of a motor secured to a movable carriage, to be solved. Such problems are all the more important as the size of the motor used is greater. The device according to the invention is therefore particularly stable.

Lastly, the use of reduction means, such as a tackle system, imparts to the means ensuring the displacement of the carriage a structure that allows them to be accommodated within a reduced volume.

The invention will be better understood and other purposes, details and advantages of the latter will appear more clearly in light of the following description given solely by way of example with reference to the appended non-limitative drawings wherein.

Figure 1:
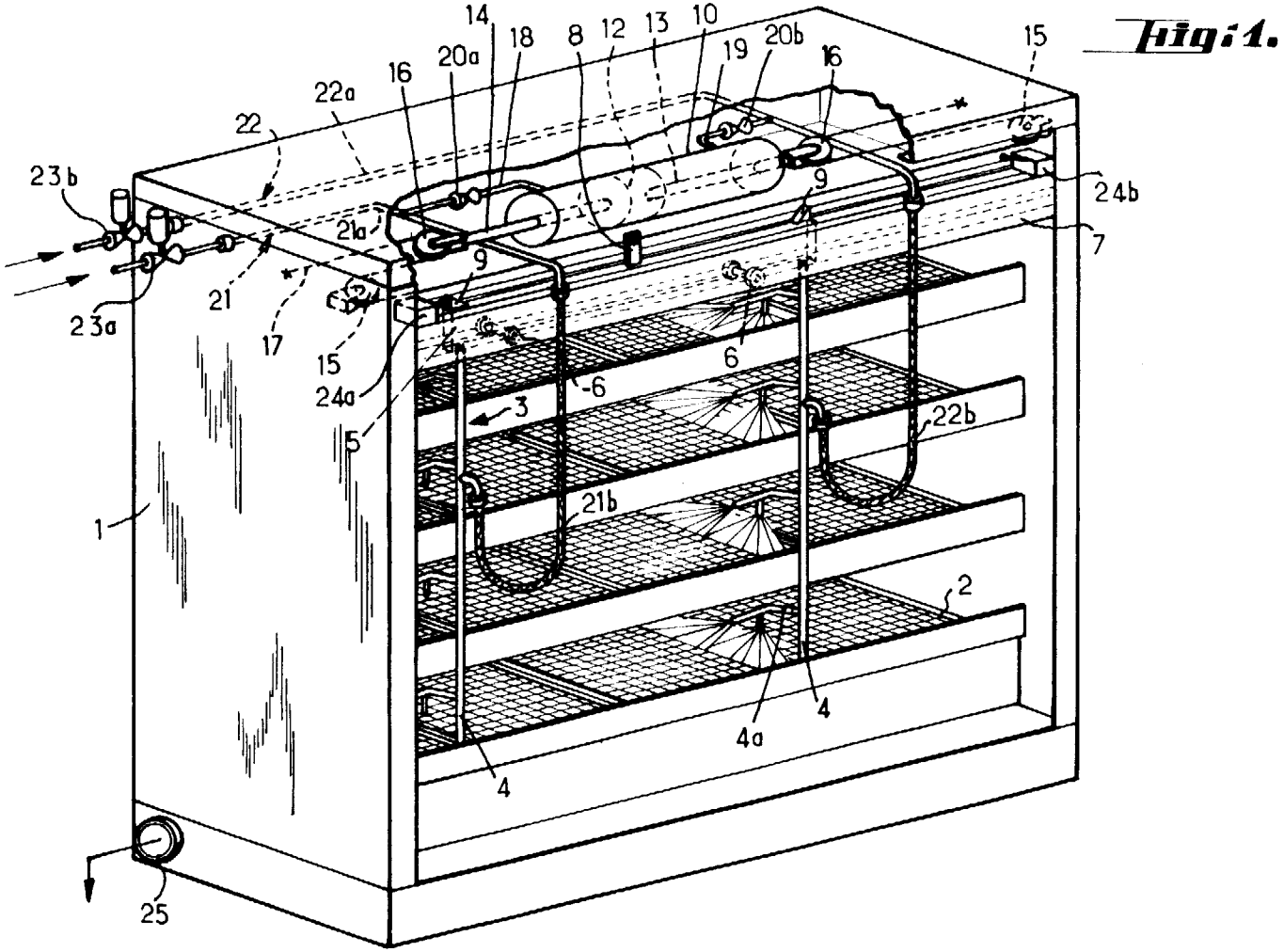
FIG. 1 is a general perspective view, partially broken away, of a filtering case with automatic cleaning according to a first form of embodiment of the invention.

There is seen in FIG. 1 a filtering case composed essentially of a frame 1 of generally rectangular parallelepiped shape, the two mutually opposite main faces of which are open to allow the passage of air. Within the case 1 are accommodated several horizontal rows of filtering panels 2. A baffle system (not shown) compels the air flowing in, for example, through the rear face of the case (when looking at the Figure) to pass through the filtering panels from bottom to top and then out through the front face. The apparatus is provided with a sprinkling device 3 constituted by two sprinkling tubes 4 provided with nozzles 4a directed towards the filtering panels 2. The tubes 4 are connected at their upper portion to a driving carriage 5 rolling through the medium of rollers 6 on a transverse rail support 7. The carriage 5 is provided on its upper portion with an arm 8 and at each of its ends with a push-member 9.

A fluid-operated double-acting actuator 10 is secured to the upper portion of the frame 1. The actuator has a piston 12 to which are connected two rods 13 and 14 extending each beyond the corresponding end of the actuator body. The member for transmitting the movement of the actuator to the carriage is constituted here by two tackle systems. Each of the tackle systems comprises a first sheave 15 mounted in a block secured to the frame 1 of the filter and a second sheave 16 mounted at the end of each of the actuator rods. The tackle systems include a common transmission cable 17 connected to the movable carriage 5 through the medium of the arm 8. The actuator 10 is connected to the cleaning liquid distributing system through the medium of two off-take pipes 18 and 19 opening into each of the actuator working chambers, respectively. Each of the said off-take pipes is preferably provided with a needle valve 20a and 20b, allowing the flow of liquid into the working chambers of the actuator and therefore the speed of displacement of the piston 12 thereof to be controlled.

According to FIG. 1, the cleaning liquid distributing circuit comprises two independent branch pipes 21 and 22, each feeding a sprinkling tube 4 and an off-take pipe 18 or 19. Both branch pipes include a rigid pipe portion 21a and 22a and a flexible pipe portion 21b and 22b allowing for the displacement of the tubes 4 together with the carriage 5. Each of the branch pipes of the cleaning liquid distributing circuit includes an electrically controlled valve 23a,23b.

The transverse support 7 on which the carriage 5 moves is provided with two microcontacts 24a,24b. These are located on the transverse support at a point corresponding to the end of the travel of the carriage and its to-and-fro movement on the support 7. The said microcontacts control the closing and opening of each of the electrically controlled valves 23a and 23b.

The operation of the sprinkling device of the filter is particularly simple and will be described below.

In a first stage, the valve 23a is open and the valve 23b is closed. The needle valves 20a and 20b have previously been adjusted according to the desired speed of the sprinkling device. The cleaning liquid therefore enters the branch pipe 21 and then flows through the off-take pipe 18 into one of the actuator working chambers and through the flexible pipe 21b into one of the sprinkling tubes 4. The cleaning liquid entering the actuator 10 pushes the piston 12 towards the right (in the Figure). The movement of the piston 12 is transmitted to the carriage 5 through the medium of the arm 14, the sheaves 15 and 16 and the cable 17. The carriage 5 is therefore driven towards the left along the transverse support 7. At the same time, the cleaning liquid is projected by the nozzles 4a onto the panels 2. When the carriage 5 reaches the end of its travel on the support 7, push-member 9 meets the microcontact 24a thereby closing the electrically controlled valve 23a and opening the electrically controlled valve 23b. The cleaning liquid then enters the rigid pipe 22a, the flexible pipe 22b and the off-take pipe 19. The piston 12 is then driven in an opposite direction to the one described previously, thereby causing the carriage 5 to return towards the right, with respect to the Figure, till the push-member 9 meets the second microcontact 24b. At that moment, the movement is again reversed, so that continuous reciprocating displacement of the carriage and the sprinkling tubes is obtained.

A conduit 25 located in the low portion of the frame allows the cleaning liquid to be discharged together with the impurities borne along thereby.

According to a preferred form of embodiment of the invention, the two tubes mounted on the carriage 5 are spaced apart by a distance equal to half the length of the filtering panels 2 to be swept.

On the other hand, owing to the use of two tackle systems, each comprising two sheaves, the effective travel of the actuator may correspond to a quarter of the said length. Considering the description of the operation of the device just made, it is seen that such arrangements are particularly advantageous, since despite the reduced travel of the actuator there is ensured a sprinkling with cleaning liquid of the filtering panels throughout their length.

Figure 2:
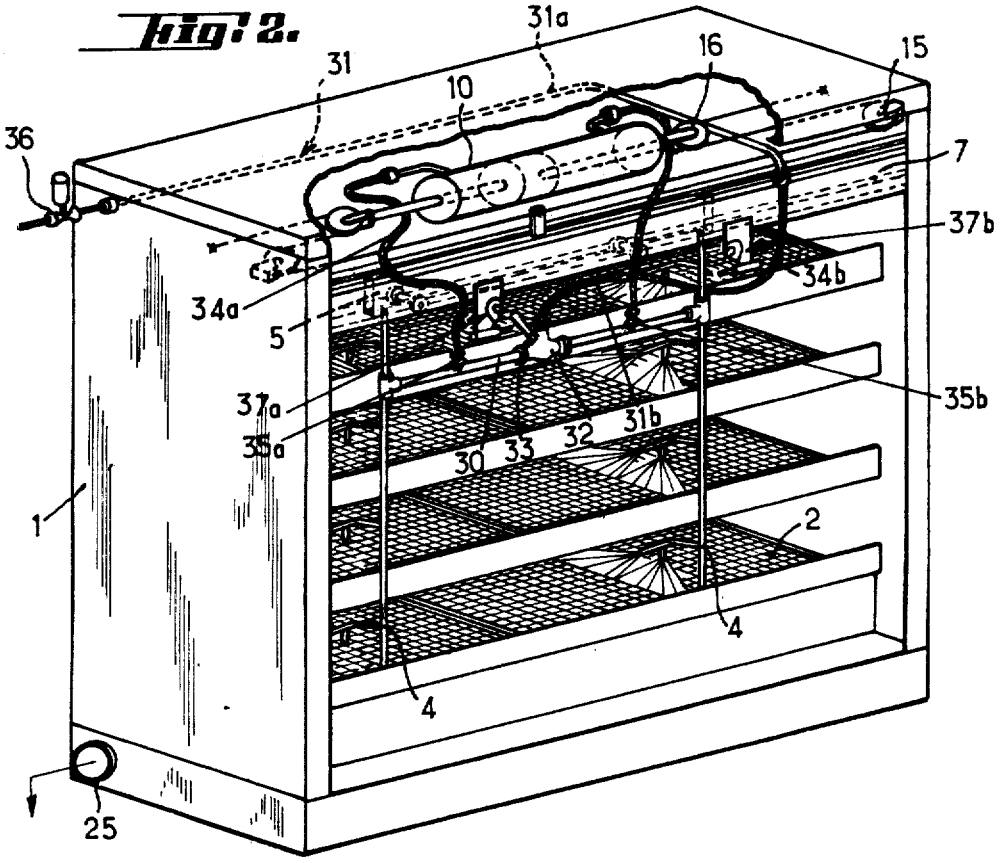
FIG. 2 is a general perspective view, partially broken away, of a filtering case with automatic cleaning according to a second form of embodiment of the invention.

FIG. 2 illustrates a second form of embodiment of the invention. The purpose of this second form of embodiment is to dispense with any electrical element within the frame, thus obviating any risk of contact of the electrical elements with water within the frame. Doing away with all such elements ensures safer operation of the device.

Referring now to FIG. 2, there is seen a filtering case similar to that of FIG. 1 and comprising in particular a frame, filtering panels, a hydraulic double-acting actuator and a tackle system for displacing a carriage carrying two sprinkling tubes. These elements are identical with those of the device of FIG. 1 and are designated in FIG. 2 by the same reference numerals.

The difference of the former embodiment of FIG. 2 compared with that of FIG. 1 lies in the sprinkling device, the cleaning liquid distributing circuit and the switching system. These elements will now be described in detail.

The two sprinkling tubes 4 are interconnected by a common conduit 30. On the other hand, the cleaning liquid distributing circuit comprises a common branch pipe 31, one portion 31a of which may be rigid and a portion 31b is flexible and connected to the conduit 30 through the medium of a three-way valve 32. Thus, the three-way valve has two outlets, each connected to a tube 4, respectively, and an inlet connected to the cleaning liquid distributing circuit. The valve 32 is provided with an actuating lever 33 allowing the valve to be so controlled as to cause the cleaning liquid to pass at one time through one of the sprinkling tubes 4 and at another time through the other.

On the other hand, two off-take pipes 34a and 34b, each preferably provided with a needle valve 35a,35b connect the conduit 30 with each of the working chambers of the actuator 10.

It will be noted that the cleaning liquid distributing circuit may also be provided with an electrically controlled valve 36 located just before the inlet of the liquid into the frame.

The switching mechanism is constituted by two symmetrical assemblies 37a, 37b secured to the frame and which, in particular, may be fastened to the latter on the transverse rail support 7 on which moves the carriage 5. These assemblies are located substantially at the ends of the travel of the valve 32 and more particularly of its actuating lever 33.

Those switching assemblies will now be described more particularly with reference to FIG. 3.

Figure 3:
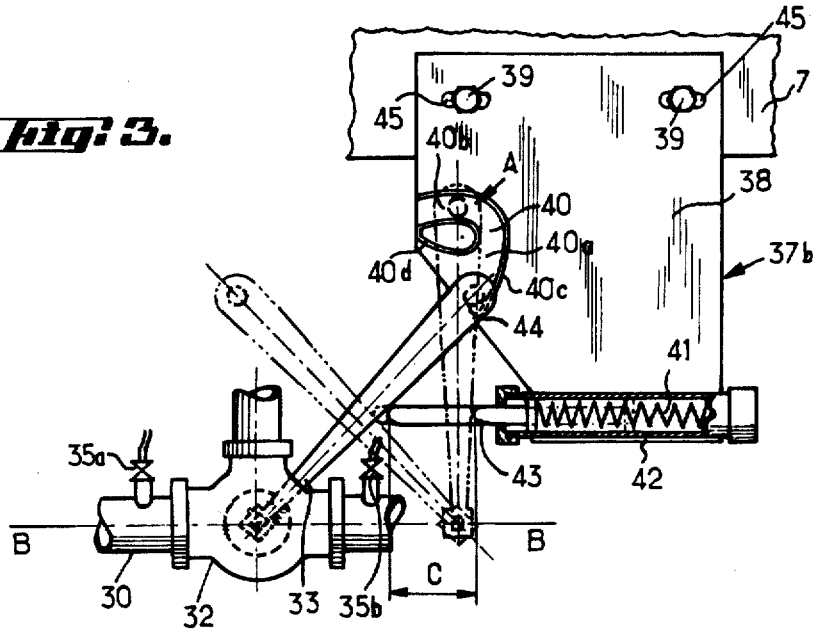
FIG. 3 shows a switching mechanism used in the filtering case of FIG. 2.

Seen in FIG. 3 is the valve 32 mounted on the conduit 30 and provided with its actuating lever 33. The following description of the switching assembly 37b may of course apply to the assembly 37a, since the two assemblies are perfectly symmetrical. The assembly 37b is composed of a plate 38 secured to the support 7, e.g. by means of screws 39. The assembly also comprises a cam 40 composed of a positive guiding portion 40a and a free escape portion 40b. In FIG. 3, the region separating these two portions is denoted by the letter A. The cam is so arranged that towards the end of the travel of the lever 33, the latter comes into contact with the cam along the positive guiding portion, possibly through the medium of a pin 44.

The switching assembly 37b also comprises an energy accumulator provided with a loading member placed on the portion of the path of the actuating lever corresponding to the engagement of the latter with the positive guiding portion of the cams. The said energy accumulator may be located at the lower end of the plate 38 and may be constituted by a spring 41 accommodated in a sleeve 42. One of the ends of the spring 41 abuts against one of the ends of the sleeve 42. The loading member may consist of a rod 43 connected with the free end of the spring and slidingly mounted in the other end of the sleeve. The rod 43 protrudes along the aforesaid travel portion illustrated in FIG. 3 by the full line C.

Preferably, the cam 40 may be constituted by two raised edges 40c, 40d defining a curved guiding groove, the free escape portion 40b extending in prolongation of the positive guiding portion 40a. The guiding portion 40a extends in a direction substantially perpendicular to that of the travel of the valve which is represented by the dot-and-dash-line B—B. The free escape portion 40b extends in a direction substantially parallel with that same travel.

The operation of the device according to FIGS. 2 and 3 will now be described. The needle valves 35a and 35b are preadjusted so as to adjust the carriage displacement speed. Assuming now the actuating lever of the valve 32 to be turned to the right (when looking at FIG. 2), the cleaning liquid passes from the pipe 31 into the right-hand tube and the take-off pipe 34b. Under the action of the actuator 10, the carriage 5 moves towards the right. This movement continues until the lever 33 contacts the switching element 37b At that moment the lever 33 is in the position shown in full lines in FIG. 3. On the one hand, the lever is in engagement with the positive guiding portion 40a of the cam and rests upon the edge 40c of the latter. On the other hand, the lever comes into contact with the rod 43. When the valve 32 moves towards the right (in FIG. 3), the lever 33 moves further ahead into the guiding portion 40a. Since it is retained by the edge 40d, it can thus compress the spring 41 through the medium of the rod 43. The movement of the valve 32 towards the right continues until the actuating lever assumes the vertical position illustrated in dot-and-dash lines in FIG. 3. At that moment, the engaging lever enters the free escape portion 40b of the cam 40, so that it is no longer subjected to the action of the raised edge 40d, thus allowing the spring 41 to exert its action. The spring thus swings the actuating lever towards the left to the substantially 45° position illustrated in dot-and-dash lines in FIG. 3. This causes the carriage to move to the left.

The switching element 37a operates in an altogether symmetrical manner when the lever reaches its level. Such a switching mechanism is particularly simple and allows the lever 33 to be prevented from remaining in a vertical position which would result in cutting off the supply of the actuator and stopping the movement.

Oblong fastening openings 45 may advantageously be provided to allow the position of the plates 38 at the end of the travel to be accurately adjusted.

Of course, a number of modifications of the invention are possible. It will be noted, in the first place, that the filtering panels are arranged horizontally on the frame. This is an advantageous arrangement for it reduces the splashing along the walls of the frame during the operation of the sprinkling device. Of course, it would be quite possible to arrange the filtering panels with a certain inclination.

On the other hand, a form of embodiment may be contemplated, although less advantageous, including a single sprinkling tube driven by a single tackle system, with a system such as a counterweight system provided to ensure the movement of the sprinkling device in the opposite direction. The use may also be contemplated of an actuator with a movable body and a stationary piston secured to the frame of the installation.

Of course, the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. A system for automatic cleaning of filter panels supported by a frame comprising means for sprinkling a cleaning liquid upon the filter panels including at least one sprinkling tube having at least one outlet nozzle directed toward at least one filter panel, carriage means joined to said sprinkling means and movably mounted to said frame for movement thereon to move said sprinkling means and said outlet nozzle with respect to said filter panel, fluid driven hydraulic motor means for moving said carriage means on said frame, transmission means interconnecting said hydraulic motor means and said carriage means to transmit movement of said hydraulic motor means to said carriage means, fluid inlet means for supplying said cleaning fluid to said sprinkling tube and offtake means communicating with said fluid inlet means and said hydraulic motor means to divert a predetermined flow of said cleaning fluid to said hydraulic motor means to power said hydraulic motor means.

2. The system of claim 1 wherein the hydraulic motor means is movable in reverse directions to move said carriage means to and fro with respect to said filter panel.

3. The system of claim 2 wherein said hydraulic motor means is a double acting cylinder comprising a piston with two working chambers separated by said piston, and respective piston rods join to said piston and extend beyond each opposite end of said cylinder.

4. The system of claim 3 wherein said frame has opposite sides and said transmission means includes a tackle system that comprises one sheave at a free end of one of said piston rods, a second sheave secured to a first portion of said frame, and a transmission cable having one end anchored to one side of said frame and passing around said first and second sheaves, said transmission cable being drivingly secured to said carriage means such that movement of said one rod in one direction causes movement of said carriage in a predetermined direction.

5. The system of claim 4 wherein said tackle system includes a sheave corresponding to said one sheave disposed at the free end of the other said piston rod and a sheave corresponding to said second sheave is secured to a second portion of said frame, said transmission cable having an opposite end anchored to an opposite side of said frame and passing around said corresponding sheaves.

6. The system of claim 5 wherein said carriage supports two sprinkling tubes spaced apart by a distance equal to one-half the length of said filter panel and the effective travel of the piston rod corresponds to one-quarter of the length of said filter panel.

7. The system of claim 3 wherein said offtake means comprises a first offtake conduit interconnecting one of said working chambers with said fluid inlet means and a second offtake conduit interconnecting the other of said working chambers with said fluid inlet means.

8. The system of claim 7 wherein said fluid inlet means comprises two separate fluid inlet conduits, said sprinkling means including two of said sprinkling tubes respectively connected to each of said fluid inlet conduits, one of said offtake conduits communicating with one of said fluid inlet means and the other of said offtake conduits communicating with the second of said fluid inlet means.

9. The system of claim 8 wherein said carriage means has to and fro limit positions on said frame, each of said fluid inlet conduits include an electrically actuatable shut-off valve, first electrical contact means for causing closure of one of said shut-off valves and causing opening of the other shut-off valve, being provided on said frame in alignment with the path of said carriage means at one of the limit positions of said carriage means, and a second electrical contact means for causing closure of the other said shut-off valve and causing opening of the one said shut-off valve, being provided on said frame in alignment with the path of said carriage means at the other of said limit positions of said carriage means whereby movement of said carriage means to said to and fro limit positions alternately shuts off and permits flow of fluid through the individual fluid inlet conduits.

10. The system of claim 7 wherein said sprinkling means includes two of said sprinkling tubes, said fluid inlet means includes a main inlet conduit and a three-way valve including two outlets connected to said main inlet conduit.

11. The system of claim 10 wherein said fluid inlet means further includes a first common conduit portion extending from one of the outlets of said three-way valve to one of said sprinkling tubes and a second common conduit portion extending from the other outlet of said three-way valve to the other said sprinkling tube whereby said three-way valves moves with said carriage means and has a path of movment corresponding to that of the carriage means.

12. The system of claim 11 wherein said first and second offtake conduits are respectively interposed on said first and second common conduit portions between said three-way valve and said sprinkling tubes.

13. The system of claim 12 wherein said three-way valve includes an actuating lever actuatable to a first operating position that shuts off the flow of fluid through one of said common conduit portions while permitting fluid flow through said other common conduit portion and actuatable to a second operating position that shuts off the flow of fluid through said other common conduit portion while permitting fluid flow through said one common conduit portion, and switching means are provided on said frame for shifting the actuating lever into said first and said second operating positions.

14. The system of claim 13 wherein said switching means include first and second cam members provided on said frame in alignment with the path of said actuating lever such that one of said cam members cause movement of said actuating lever toward one of said lever operating positions when said carriage means moves to one of said to and fro limit positions and the other said cam member causes movement of said actuating lever toward the other of said operating positions when said carriage means moves to the other said to and fro limit position.

15. The system of claim 14 wherein said first and second cam members are symmetrical, each said cam member including a positive guide portion which controls actuating movement of said actuating lever when said lever engages said cam and a free escape portion that permits separation of said lever from said cam.

16. The system of claim 15 wherein said switching means further includes an energy accumulator cooperating with each of said cam members, each said energy accumulator including a loading member engageable with said actuating lever and energizable by said actuating lever while said actuating lever moves along the positive guide portion of said cam member, said loading member urging said actuating lever toward one of said lever operating positions when said actuating lever is at the free escape portion of said cam member.

17. The system of claim 16 wherein said energy accumulator comprises a resilient spring member accommodated in a sleeve, said loading member being a rod extending from an open end of said sleeve and engaging said spring member, whereby energization of the loading member is accomplished by said actuating lever biasing said rod against said spring when said actuating lever moves in the positive guide portion of said cam, said spring being unrestrained when said lever is in the free escape portion of the cam wherein said spring urges said rod against said lever to cause said movement of said lever out of the free escape portion of said cam toward said one layer operating position.

18. The system of claim 1 including a plurality of said filter panels in tier arrangement.

* * * * *